Figure 1:
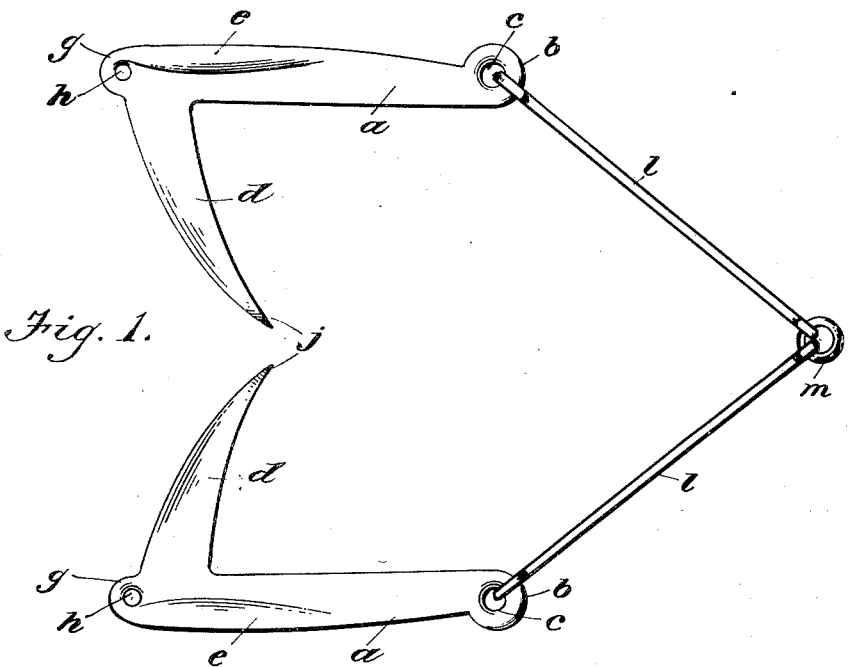

(No Model.)

D. H. LANGAN.
GRAB HOOK.

No. 595,181. Patented Dec. 7, 1897.

Witnesses:
C. F. Duvall
F. W. Blackstone

Inventor:
David H. Langan,
By W. J. Duvall, Attorney.

United States Patent Office.

DAVID H. LANGAN, OF LEETONIA, PENNSYLVANIA, ASSIGNOR OF ONE HALF TO CHARLES M. SHAUT, OF SAME PLACE.

GRAB-HOOK.

SPECIFICATION forming part of Letters Patent No. 595,181, dated December 7, 1897.

Application filed January 25, 1897. Serial No. 620,645. (No model.)

*To all whom it may concern:*

Be it known that I, DAVID H. LANGAN, a citizen of the United States, residing at Leetonia, in the county of Tioga and State of Pennsylvania, have invented certain new and useful Improvements in Grab-Hooks; and I do hereby declare the following to be a full, clear, and exact description of the invention, such as will enable others skilled in the art to which it appertains to make and use the same.

My invention relates to improvements in grab-hooks employed for skidding logs. These hooks have usually been constructed by blacksmiths and have been drawn out or wrought, the driving-tooth being produced by a bending of the shank. This has resulted necessarily in a thinning of the hook at its angle, which is the very portion subjected to the greatest amount of strain and where any weakness whatever results in a vital defect. Furthermore, this thinning of the metal at this point left a reduced surface for receiving the impact of the usual maul, the result of which was that from one to two mauls of a value nearly as great as the hook itself were destroyed in a single day. These hooks have not usually been wrought by any particular pattern on account of the necessity of a cheap construction; but, on the contrary, their general form and contour have been generally left to the blacksmith, as a result of which negligence many hooks are found to be imperfect in very many respects, and on the whole there has been a constant tendency to produce anything but a uniform and desired style of hooks.

The objects of this invention are to produce a hook from cast-steel, so that a uniformity of design follows, and to include in this design of hooks several important and desirable features which will combine to produce what I consider a perfect hook for the purpose intended.

One of the prime features of my invention is to so construct the hook as to obviate undue wear and destruction of the mauls and to thereby increase the period of their utility from a half-day to a month, more or less; secondly, to so construct the tooth of the hook as to adapt it to be more readily driven in the side of the log to be skidded; thirdly, to increase the strength of the hook at the point at which the greatest strain occurs—to wit, the angle—and, fourthly, to so form the hook as to facilitate its withdrawal from its engagement with the log by means of the usually-employed pike-lever.

With these various objects in view my invention consists in the particular and peculiar form of hook herein described, and pointed out in the claim.

Figure 2:
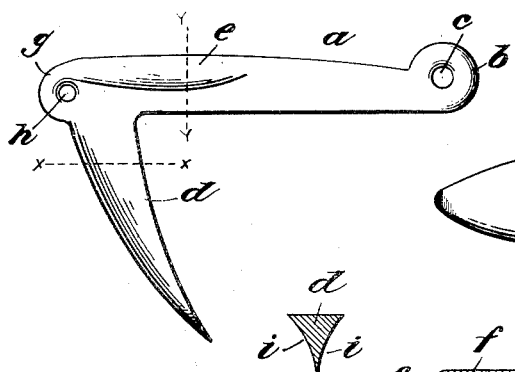
Figure 3:
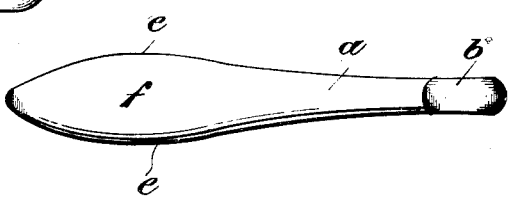
Figures 4, 5:
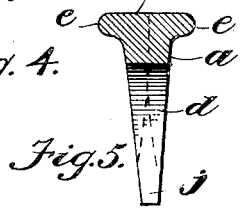

Referring to the drawings, Figure 1 is a plan of a pair of grab-hooks illustrating their relative arrangement when in engagement with a log for the purpose of skidding the same. Fig. 2 is a detail in plan of one of the hooks. Fig. 3 is a side elevation of the same. Fig. 4 is a transverse sectional view on the line $x\ x$ of Fig. 2; Fig. 5, a similar sectional view on the line $y\ y$ of Fig. 2.

Like letters of reference indicate like parts in all the figures of the drawings.

The hook consists of a shank $a$, the inner side of which is preferably formed on a straight line, or, in other words, is plain, so as to adapt the shank to lie snugly in contact with the surface of the log. At the front end of the shank is formed a slight enlargement $b$, the tendency of which is outward, and in the same is produced an eye $c$. Near the rear end of the shank there is formed a penetrating or driving tooth $d$, and immediately above the same the shank on its upper side is widened by means of overhanging enlargements or flanges $e$ on opposite sides, so as to produce a greatly-enlarged impact-surface $f$ substantially in line with the tooth $d$ and intended to receive the blows of the maul when in the act of driving the tooth to a degree of penetration with the log. The shank is extended slightly in rear of the tooth and is preferably reduced at that point to form an ear or projection $g$, the same preferably having formed in it an eye $h$.

The tooth when viewed in cross-section has the appearance illustrated in Fig. 4, to wit: It is substantially triangular, with the exception that its opposite sides are concaved from about its penetrating point to its heel, as indicated at $i$. The lower extremity of the tooth $d$ is chisel-pointed, as indicated at $j$, Fig. 5.

In use a pair of these grab-hooks is employed for skidding a log, such pair being shown in Fig. 1. The links or chains $l$ are connected to the eyes $c$ and these in turn are connected at their front ends by a ring $m$, to which is attached the usual draft appliance. (Not considered necessary to be herein shown.)

As before stated, it is proposed to cast the thus-described grab-hooks from steel, so that they will be uniform in proportion and configuration and each will contain all of the inherent qualities and advantages that are intended. It will be apparent that when in the act of driving the hook, so that its tooth penetrates a log, the maul instead of, as heretofore, coming in contact with a narrow, reduced part of the hook will contact with the widened surface $f$. The form of tooth that I have described will also greatly facilitate the tendency of the tooth to penetrate the log, thus requiring less exertion upon the part of the operator and doing less damage to the maul. Again, the increased amount of stock or maul formed by the flanges $e$ will strengthen the hook at this particular part, whereby the period of utility of the same is correspondingly increased. A still further and final advantage in this form of hook is secured by the ear $g$, the eye of which permits of the introduction of the spike on the end of the usual pike-lever or cant-hook for the purpose of prying out the tooth of the dog from its engagement with the log. Heretofore the rear end of the dog has been devoid of any protuberance, so far as my experience goes to show, and it is customary to thrust the point of the lever referred to under the shank in advance of the tooth. This operation, though successful so far as prying out the tooth was concerned, was oftentimes highly injurious to both the grab-hook and the spike of the lever, for the reason that a quick and hard thrust being necessary in order to cause the spike to take under the shank often disconcerted the aim of the operator to such an extent as to cause the spike to contact sharply with the shank of the hook, which had a tendency to upset the spike, so as to require a resetting by the blacksmith, and also indent, weaken, and sometimes break the hook at its weakest point.

It will be obvious that the tooth of the hook may be repointed by a blacksmith the same as is now the practice.

Having described my invention, what I claim is—

The combination with the pair of grab-hooks, each consisting of a shank having an eye at its front end and at its rear end having a projecting, perforated ear, immediately in front of which latter is located an angularly-disposed driving-tooth, said shank being widened above its tooth for the purpose of producing an increased impact-surface, of a draft device connected with the eyes at the front ends of the shanks, substantially as specified.

In testimony whereof I affix my signature in presence of two witnesses.

DAVID H. LANGAN.

Witnesses:
JOSEPH GORTON,
C. M. SHANT.